Nov. 1, 1932.  C. J. ELLIS  1,885,191
CAR TRUCK
Filed Feb. 23, 1929  7 Sheets-Sheet 1
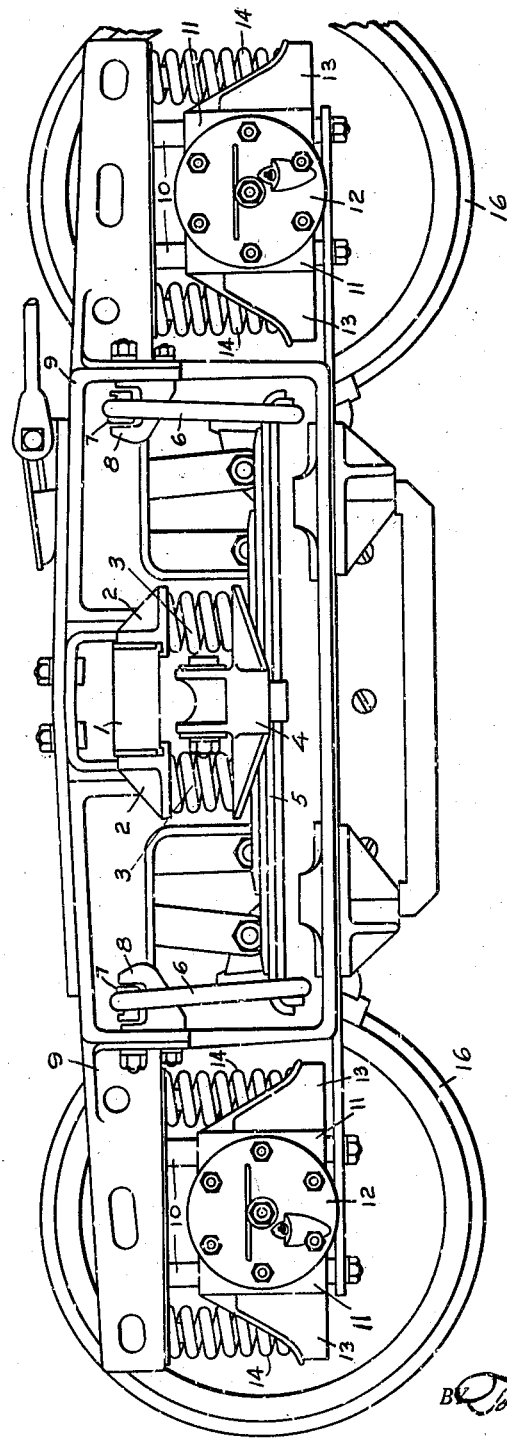
INVENTOR.
CHARLES J. ELLIS.
BY
ATTORNEYS.

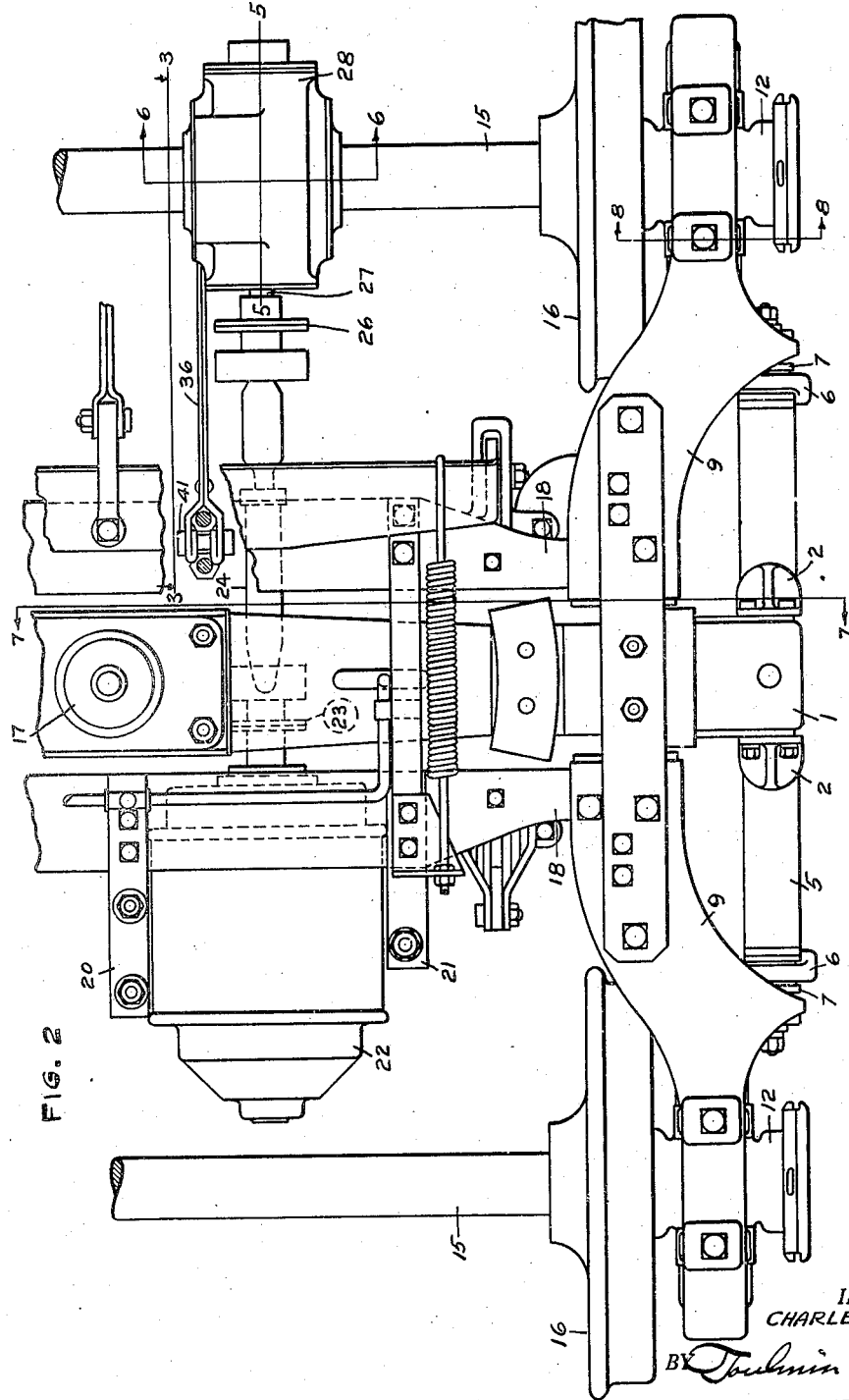

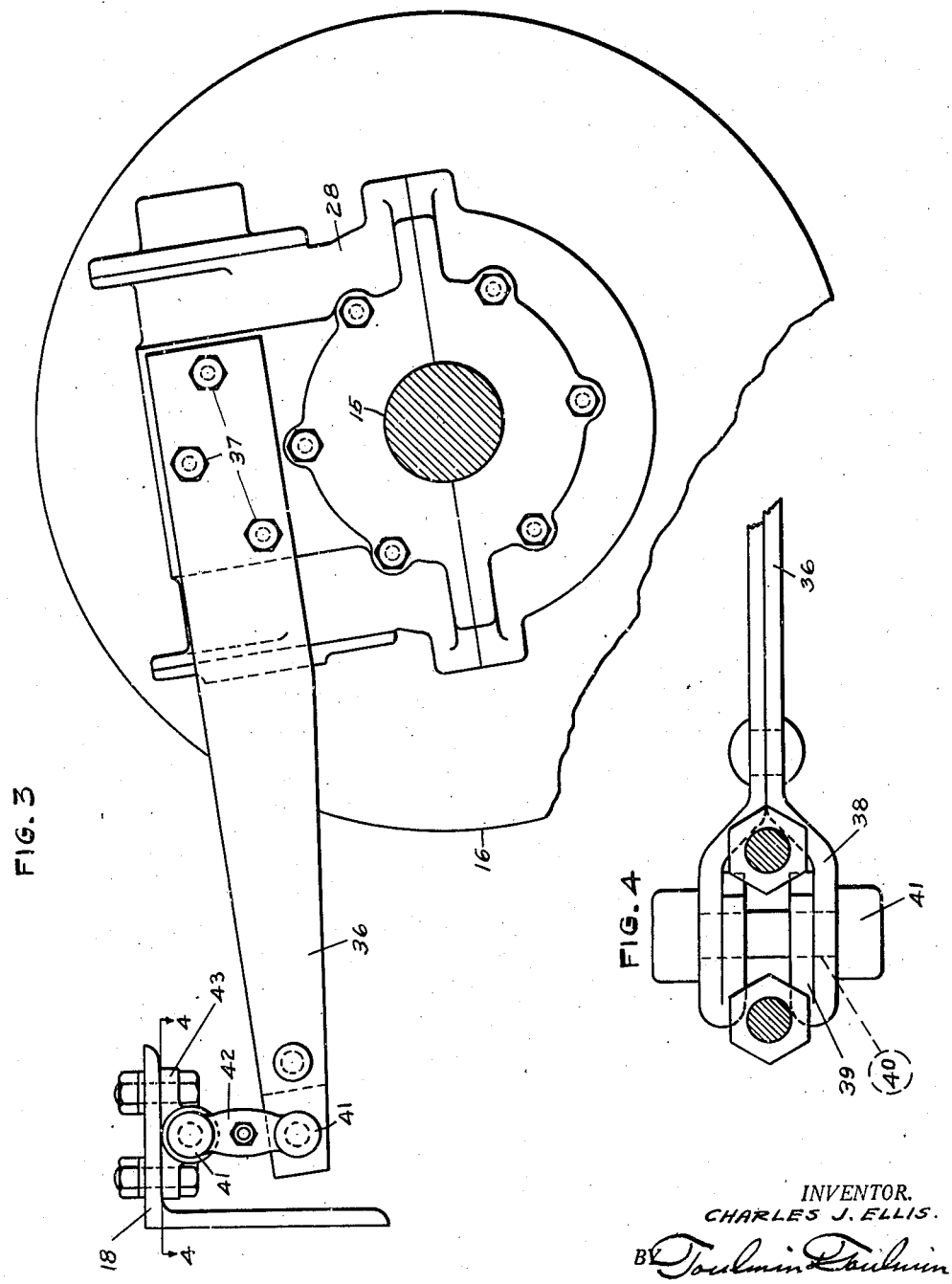

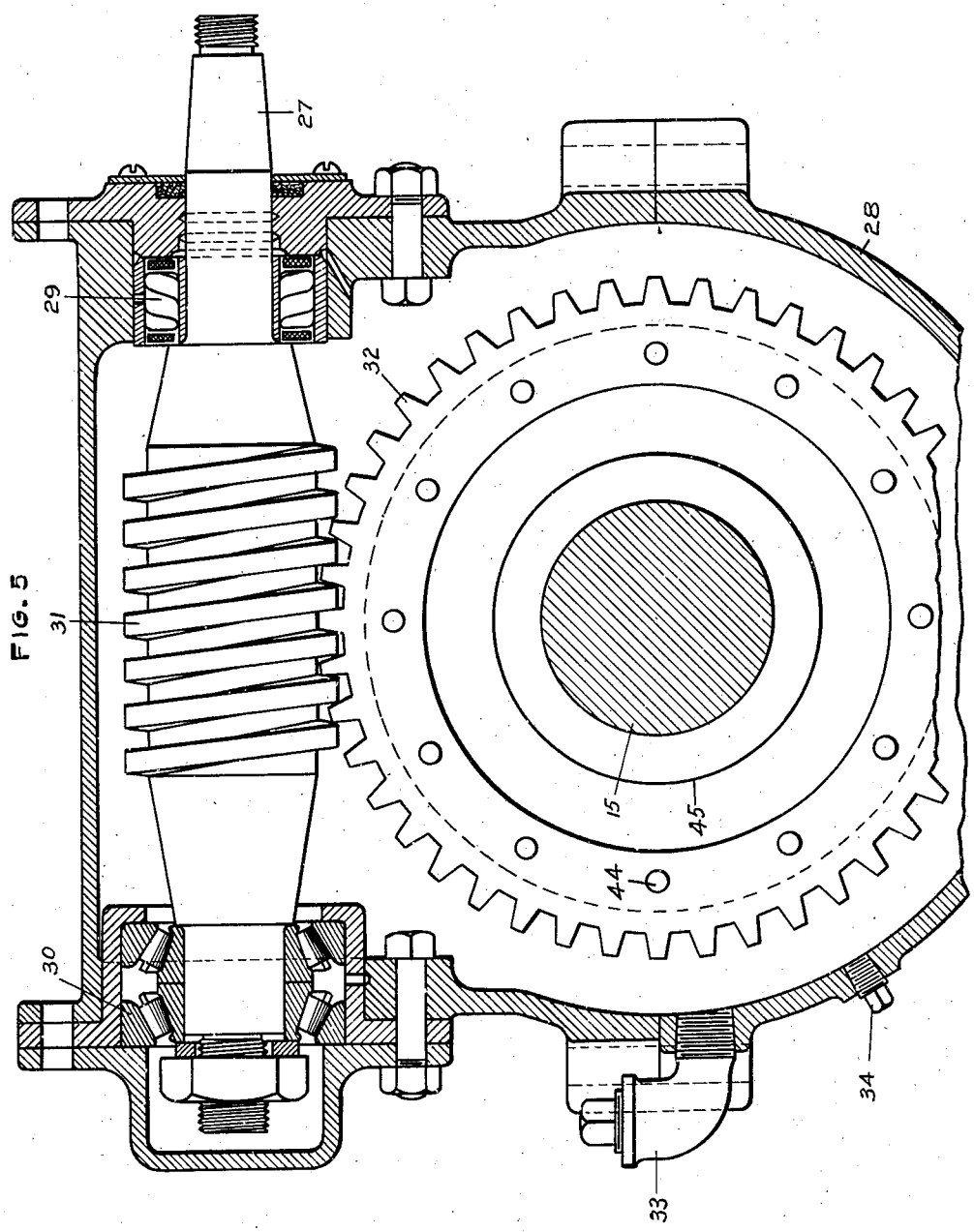

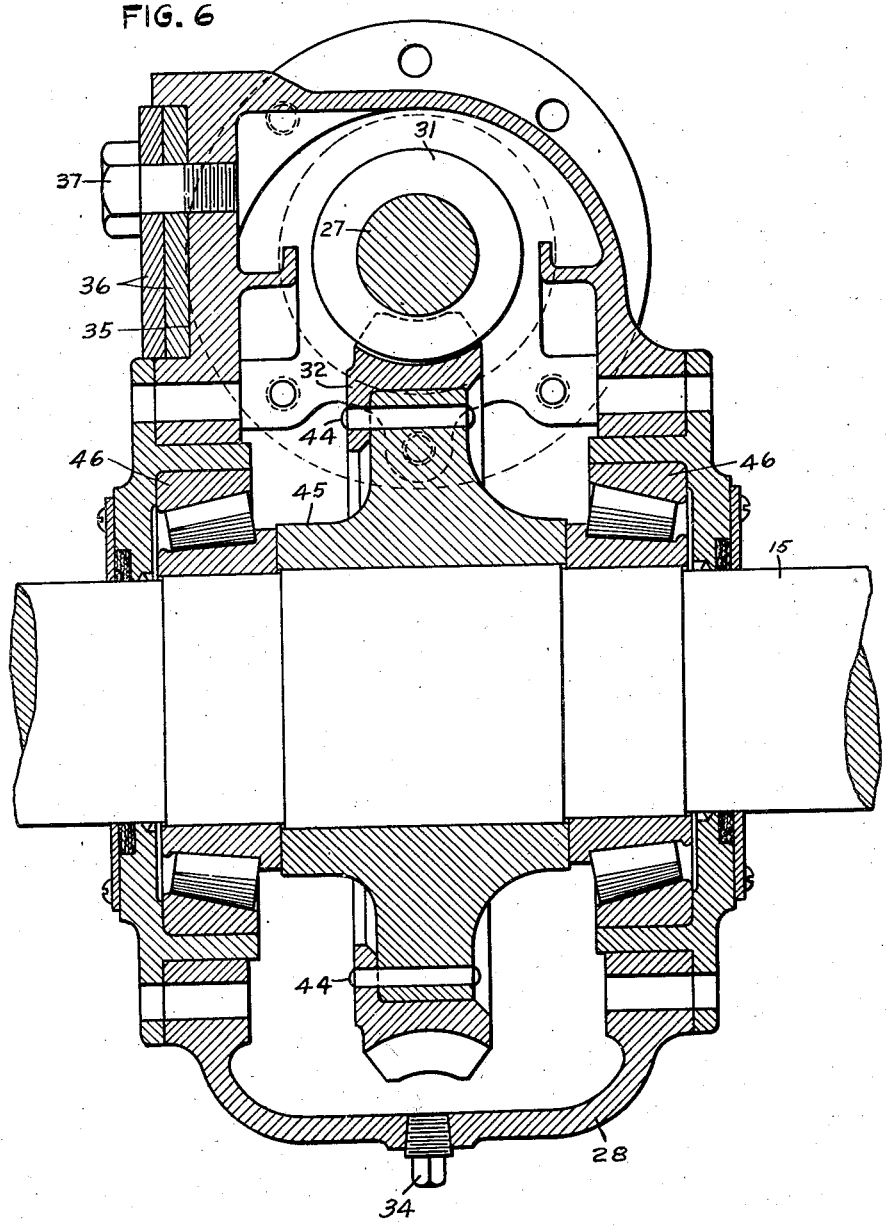

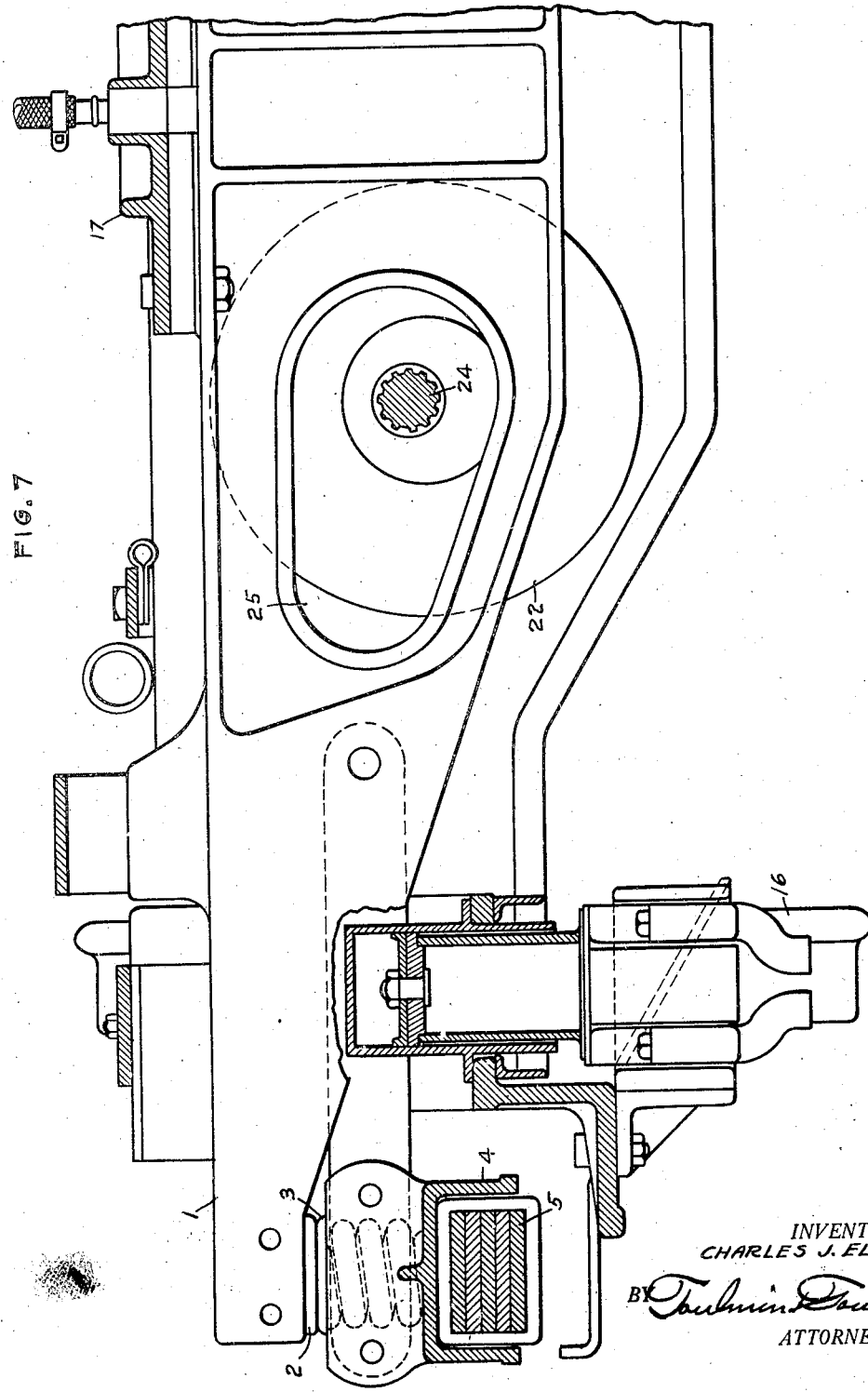

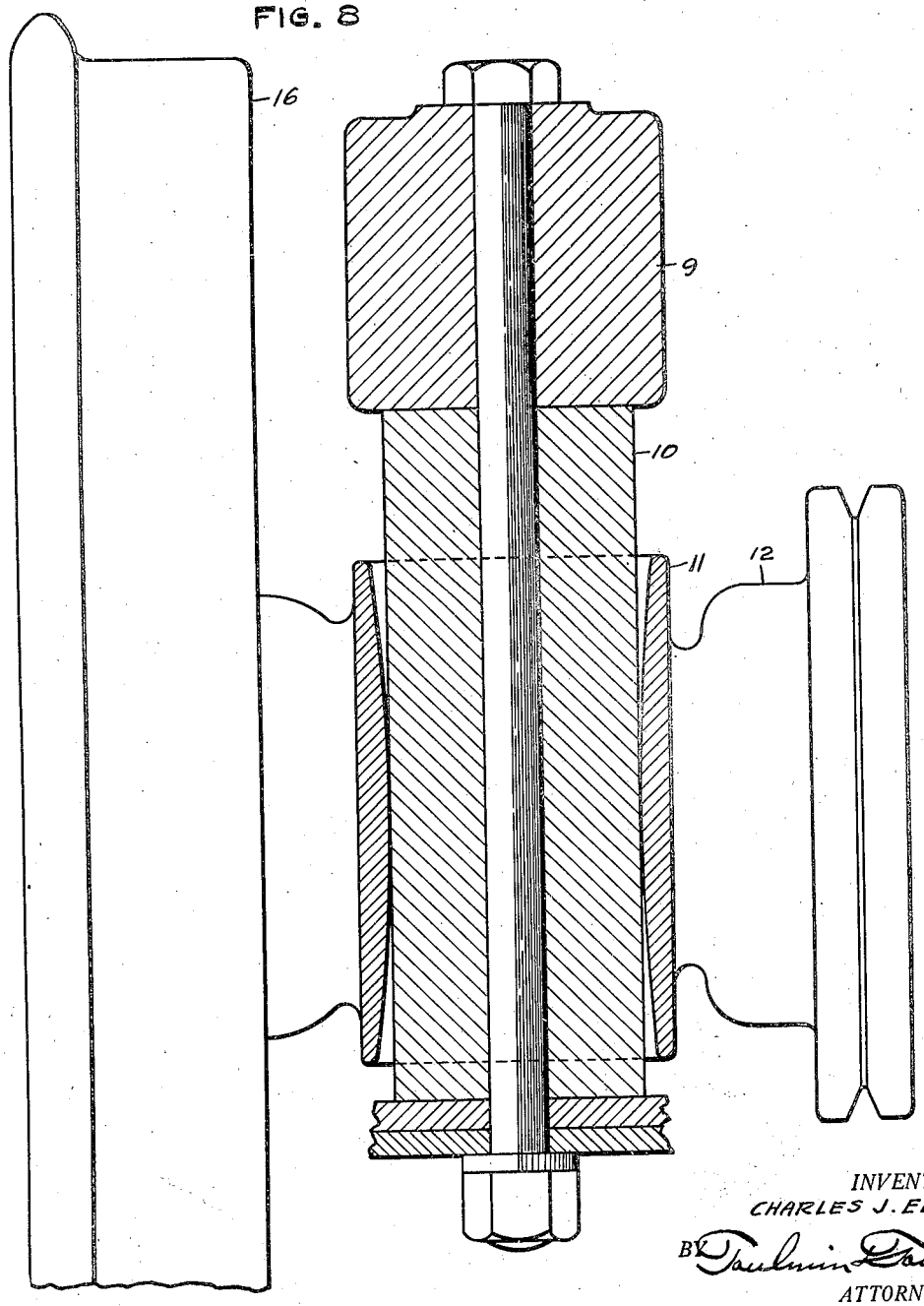

Patented Nov. 1, 1932

1,885,191

UNITED STATES PATENT OFFICE

CHARLES J. ELLIS, OF CINCINNATI, OHIO, ASSIGNOR, BY MESNE ASSIGNMENTS, TO THE CINCINNATI CAR CORPORATION, OF CINCINNATI, OHIO, A CORPORATION OF OHIO

CAR TRUCK

Application filed February 23, 1929. Serial No. 341,986.

My invention relates to car trucks.

It is the object of my invention to provide a car truck having a motor driven direct axle drive truck in which the motor is spring-suspended through the truck springs, and so arranged that the relative movement of the axle and gear, the truck frame, truck bolster and motor may be accommodated without disturbing the operative relationship of the several parts.

It is my object to provide means of accommodating the lateral movement of the axle and gear mechanism with respect to the truck frame, and for yieldingly accommodating that lateral movement in order to maintain within reasonable limits the predetermined necessary relationship between the truck frame on the one hand and the axle and gearing on the other. Thus the evil of unsprung motor weight mounted on the axle is avoided, and the disadvantage of lateral movement with respect to the frame and motor unit is accommodated.

It is my object to provide such means which yieldingly accommodates the lateral movement and which will also accommodate the vertical movement of the axle and gearing on the one hand and the truck and the motor on the other hand.

Referring to the drawings:

Figure 1 is a side elevation of the truck.

Figure 2 is a plan view of one-half thereof, including the motor and driving units.

Figure 3 is a section on the line 3—3 of Figure 2, looking in the direction of the arrows.

Figure 4 is a section on the line 4—4 of Figure 3.

Figure 5 is a section on the line 5—5 of Figure 2.

Figure 6 is a section on the line 6—6 of Figure 2.

Figure 7 is a section on the line 7—7 of Figure 2.

Figure 8 is a section on the line 8—8 of Figure 2.

Referring to the drawings in detail, 1 designates a bolster mounted in either end of the saddles 2, that are in turn mounted upon the helical springs 3. These helical springs are mounted upon a leaf spring saddle 4, that is centrally located upon the leaf spring 5. This leaf spring is swung at either end upon the links 6, that are carried in the saddle 7 of the brackets 8 on the side frames 9.

The mounting of the links is such as to provide for lateral movement, as well as some fore and aft movement. The ends of the frame member are provided with downwardly extending spaced bearing box guides 10, which are located in flared end bores in the sleeves 11 of the bearing box, with respect to which they are permitted lateral movement. The bearing box 12 is provided with wings 13 forming supports for the helical springs 14 interposed between the frame 9 and the bearing box 12. 15 designates the axle carried in such bearing boxes. The axles are in turn supported by the conventional wheels 16.

The bolster 1 carries a king pin plate 17 for supporting the body of the car. The side frames 9 are connected together by the spaced transoms, designated 18.

One of these transoms has mounted thereon the brackets 20 and 21, which support a motor 22. This motor is connected by a flexible driving connection 23 to a driving shaft 24, which passes through the enlarged opening 25 in the bolster 1. The other end of the driving shaft is connected by a flexible cup link 26 to the worm shaft 27, which is journaled in the gear housing 28. The shaft 27 is supported at its forward end by a roller bearing 29 and at its rear end by a tapered thrust bearing 30. The worm 31 meshes with the worm gear 32, mounted upon the axle 15, which turns in a reservoir of oil formed by the gearing casing 28, which may be replenished through the filling spout 33 and drained by the drain plug 34.

This gear casing 28 has attached to the side thereof in a recess 35 a pair of steel spring plates 36, which are bolted to the frame by the bolts 37.

The free ends of these spring plates are spread apart to form a yoke 38 with the ends thereof turned over as at 39 so that eyes 40 can be formed for the reception of a shackle bolt 41.

This shackle bolt is connected to a shackle 42, the upper end of which is pivotally connected to the plate 43 carried on the under side of one of the transoms 18, thus tying this end of the spring arm to the truck frame so that the lateral movement of the gears, gear casing, axle and wheels with respect to the frame will be limited in a yielding manner.

The worm gear 32 is mounted with pins 44 upon a sleeve 45 carried on the axle 15, while either side of this sleeve engages with the lateral tapered roller thrust bearing 46, which cooperates in taking up the thrust, together with the spring plates 36 incident to the lateral movement of the axle, wheels and gearing.

The brake rigging is mounted in the usual manner, as indicated upon the truck frame, but as there is no special arrangement thereof other than the improvements of this truck, it does not interfere with the braking and its details are of no importance in this invention.

Operation.

The limiting of the lateral movement of the axles is a direct function of the journal bearings. This invention accomplishes the use of a particular type of actuating mechanism as described in combination with axles and truck frames without further limiting this freedom of lateral motion between the axles and frames.

Referring to Figure 2, between the motor 22 and the gear housing 28 containing the worm drive, there is installed the flexible shaft 24 with the universal joint 23 at the motor or driving end and another universal joint 26 at the gear or driven end.

Referring to Figures 3 and 4, between the gear housing 28 and the transom 18 there is a torque arm 36 bolted to the gear housing 28 with bolts 37 connected with the transom 18 with a vertical shackle 42 through the bracket 43.

If the car were started with the drive as shown in Figure 2, with the torque arm and without the various associated parts shown in Figure 3, the worm 31 would crawl in one direction or the other around the worm gear 32 to the limit of the flexible shaft, wedging itself in this position and causing considerable damage to the mechanism. The present invention prevents the worm drive from rotating upon itself by using the torque arm attaching it to a permanent part of the truck, such as the transom shown in Figure 3, designated 18. Since the transom has considerable vertical movement in relation to the axle upon which the gear housing is mounted, it is necessary to flexibly connect the torque arm to the transom thus holding the driven parts in vertical and longitudinal relationship with the motor or driving parts.

Referring to Figures 5 and 6, the position of the worm gear is fixed by pressing on the axle and the housing containing the worm is fixed in relationship to the axle and worm gear by the mounting of the bearings in the housing. The torque rod is fixed in its relationship to the axle and gear by being bolted to the gear housing as shown in Figure 3, and is fixed laterally to the transom as shown in Figures 3 and 4.

It is, therefore, necessary to obtain some lateral movement in this mounting to permit the shifting of the axle and its mechanism laterally with respect to the journal bearings and the side frames. This is accomplished by the present invention by making the torque arm of two comparatively thin sections of spring steel of sufficient depth to carry the vertical load. The two sections of spring steel are held together at the axle end by the bolts 37 and at the transom or shackle end with a rivet as shown in Figures 3 and 4. The flexing of this torque member sidewise as a leaf spring permits the flexing movement of the axle with respect to the side frame.

It is the object of my invention to permit the full lateral motion between axle and frames as pre-determined from the construction of the journal bearing mechanism.

I desire to comprehend within my invention such modifications as may be clearly embraced within my claims and the scope of my invention.

Having thus fully described my invention, what I claim is new and desire to secure by Letters Patent, is:

1. In a car truck, side frames, axles and wheels, means for yieldingly mounting said side frames on said axles, transoms between said axles connecting said side frames, a bolster yieldingly mounted at either end on said side frames, said bolster being adapted to support a vehicle, a driving means mounted on one of said transoms, a driving shaft adapted to pass through said bolster whereby the bolster movement will not affect the driving means, said driving means being connected to one of said axles.

2. In a car truck, side frames, spaced transoms connecting said side frames, axles and wheels, means for yieldingly mounting the ends of said frames on said axles, a transverse bolster adapted to support a vehicle centrally thereof, saddles on the ends of said bolster, and spring means flexibly connected to said side frames supporting said saddles and bolster ends, driving means mounted on one of said transoms, a driving shaft adapted to pass through said bolster and arranged not to be affected by the bolster, gearing on one of said axles connected to said driving means.

3. In combination a car truck, a driving means mounted thereon, a driving shaft connecting said driving means to one of said axles, a worm mounted on said driving means, a solid axle carrying car truck supporting wheels, a gear casing mounted on said solid axle for supporting said worm having a pair of oppositely inclined tapered roller thrust bearings at the rear end thereof and a roller bearing at the forward end thereof, a worm gear mounted on the axle in said gear casing, tapered roller bearings on each of the oppositely tapered roller thrust bearings for taking the lateral thrust therebetween and the axle.

4. In combination, a continuous axle, a gear casing having a pair of oppositely tapered roller bearings mounted thereon and adapted to permit the axle to turn freely therein without lateral movement, a pair of oppositely tapered roller bearings mounted on said axle cooperating with the first bearings, a worm gear mounted therebetween on said axle, a driving worm mounted in said casing, a pair of oppositely tapered roller thrust bearings at the free end thereof and a roller bearing at the driven end thereof.

In testimony whereof, I affix my signature.

CHARLES J. ELLIS.